United States Patent [19]
Karnopp

[11] Patent Number: 5,346,242
[45] Date of Patent: Sep. 13, 1994

[54] APPARATUS FOR ACTIVE MOTOR VEHICLE SUSPENSIONS

[75] Inventor: Dean C. Karnopp, Davis, Calif.

[73] Assignee: Robert Bosch GmbH, Stuttgart, Fed. Rep. of Germany

[21] Appl. No.: 379,699

[22] Filed: Jul. 11, 1989

Related U.S. Application Data

[63] Continuation of Ser. No. 129,114, Dec. 4, 1987, abandoned.

[30] Foreign Application Priority Data

Dec. 9, 1986 [DE] Fed. Rep. of Germany ....... 3641950
Nov. 11, 1987 [DE] Fed. Rep. of Germany ....... 3738284

[51] Int. Cl.5 ............................................. B60G 17/015
[52] U.S. Cl. .................................................. 280/707
[58] Field of Search ................ 280/707, DIG. 1, 840, 280/6.12

[56] References Cited

U.S. PATENT DOCUMENTS

| | | | |
|---|---|---|---|
| 4,354,693 | 10/1982 | Maeda et al. | 280/DIG. 1 |
| 4,630,840 | 12/1986 | Masuda et al. | 280/DIG. 1 |
| 4,648,622 | 3/1987 | Wada et al. | 280/707 |
| 4,678,203 | 7/1987 | Röhner et al. | 280/707 |
| 4,685,689 | 8/1987 | Takizawa et al. | 280/707 |
| 4,700,971 | 10/1987 | Doi et al. | 280/707 |
| 4,715,289 | 12/1987 | Okamoto et al. | 280/6 H |
| 4,717,173 | 1/1988 | Sugasawa et al. | 280/707 |
| 4,765,648 | 8/1988 | Mander et al. | 280/707 |
| 4,770,438 | 9/1988 | Sugasawa et al. | 280/707 |
| 4,838,574 | 6/1989 | Baraszu | 280/707 |
| 4,916,632 | 4/1990 | Doi et al. | 280/707 |

*Primary Examiner*—Karin L. Tyson
*Attorney, Agent, or Firm*—Edwin E. Greigg; Ronald E. Greigg

[57] ABSTRACT

In an apparatus for active motor vehicle suspension control, a fast-acting load leveler is included in the suspension system, with associated active or semi-active dampers and additional passive suspension and damper elements. As a result, a particularly good separation between wheel motions and vehicle body motions is attainable, in combination with good wheel motion damping properties and load leveling that maintains an adjustable vehicle height.

5 Claims, 8 Drawing Sheets

APPARATUS FOR ACTIVE MOTOR VEHICLE SUSPENSIONS

This is a continuation of copending application Ser. No. 129,114 filed Dec. 4, 1987, now abandoned.

BACKGROUND OF THE INVENTION

This invention is based on an apparatus for active motor vehicle suspensions and relates to active vehicle suspensions in motor vehicles; concepts based on known load leveling systems are presented that, taking these load leveling systems as a point of departure, illustrate specialized aspects of the invention.

For instance, it is known that conventional load leveling suspension systems correct changes in the position of the vehicle body with respect to the roadway that are due solely to static loads, and that they require very little energy for making such corrections. On the other hand, fully active suspension systems having a fast servomechanism between the wheels and the body must be capable of reacting in the frequency range of the natural wheel motion and therefore require an extremely large amount of energy, in order to isolate the vehicle body from the interference originating at the wheels.

A further class of active systems, which react actively only to low-frequency inputs (natural vehicle body frequency), but not to high-frequency inputs, could be characterized as a fast-acting load leveler suspension (FLLS), or fast load-change compensation system; the term "load change" is intended to mean a supplementary force (centrifugal force) resulting from vehicle maneuvers (cornering, braking) or from the vehicle load.

In designing a motor vehicle suspension system, such a system must also include passive spring and damper elements; the springs can be integrated in the active leveling units (air suspension; see FIG. 1) or, in the conventional manner, disposed parallel to the damper (hydraulic leveling unit; see FIG. 2), and the damper element may either be passive, active, or semi-active. The variants shown in FIGS. 1 and 2 for the topological arrangement of suspension elements (leveling unit, spring, damper) do have gradual, but not basically different, effects on the behavior of the system.

Further discussions of this general field and of known systems can be found in the following sources: Dean Karnopp, "Active Damping in Road Vehicle Suspension Systems", *Vehicle System Dynamics*, Vol. 12, No. 6, 291–311; Bruce MacLaurin, "Progress in British Tracked Vehicle Suspension Systems", SAE Paper No. 830442, 1983; Dean Karnopp, "Two Contrasting Versions of the Optimal Active Vehicle Suspension", *Dynamic Systems: Modeling and Control*, ASME Publication DSC-Vol. 1, 1985, 341–346, and finally, the published European Patent Application corresponding to EP-A 0196316. In these sources, semi-active damping systems for damping the courses of motion of two bodies, in particular in a vehicle wheel/body suspension system, are explained in detail.

Figures 1, 2A:
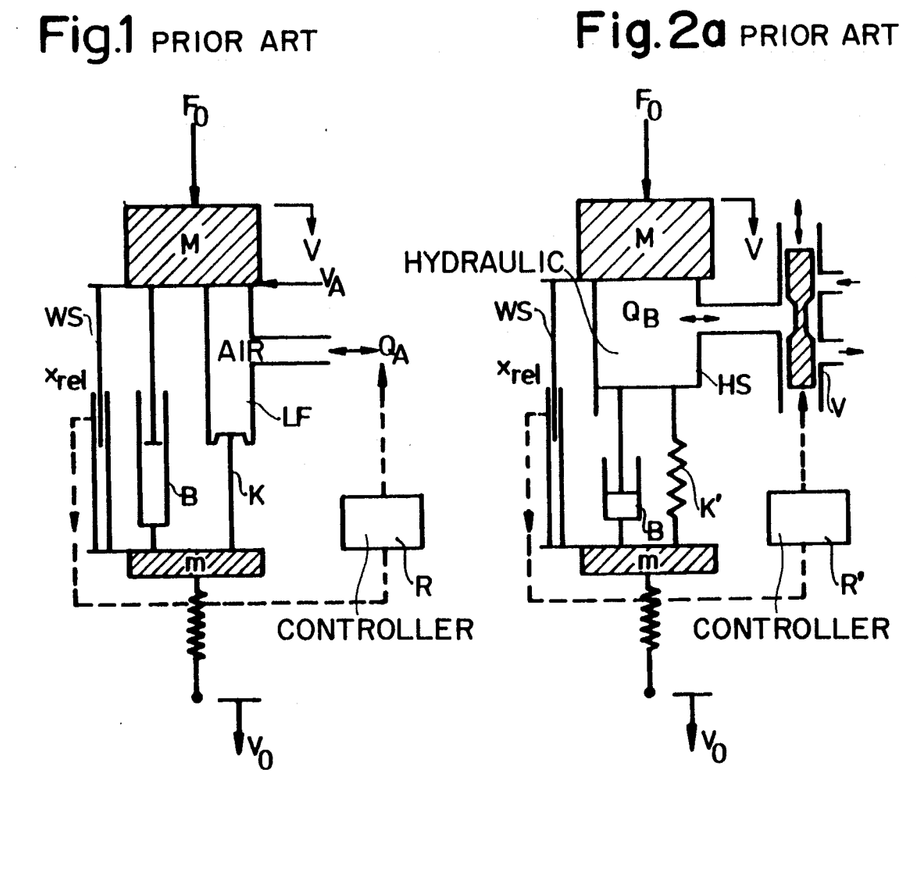
FIG. 1 is a schematic view of an embodiment of a conventional wheel suspension with load leveling, comprising an air suspension and passive damper.
FIG. 2a shows, first, the conventional wheel suspension corresponding to FIG. 1, in which a hydraulic positional compensation is provided; and beside it.

On the basis of a fast-acting load leveler suspension as shown in FIG. 1 or FIG. 2, in combination with passive damping elements, the following basic observations can be made, and the problems associated with such a system can be identified:

If the active load leveling components are incorporated into the regulation of the spring deflection, then at high gain values, an attempt at fast compensation of static deflections causes vehicle body instability. Low gain factors (slow leveling) are unable to compensate for fast load changes.

In both basic systems, the FLLS brings about a reduction in the damping property of the passive damper, and thus leads to unstable system behavior, if the basic damping by this passive element is too low. This fact would necessitate either high passive damping (a hard ride), error recognition in the event of increasing instability, or an adaptation of the gain with a worsening of the system damping.

One positive aspect of an active suspension with FLLS is its "fail-safe" property, because even with the FLLS switched off, chassis function is assured by the existing passive components.

An active control system having FLLS is intended especially to control low-frequency vehicle body motion based on the above-described load change. Thus, it appears useful not to take high-frequency motion (natural wheel dynamics) into account in the regulation, that is, the closed loop control; this could be achieved by low-pass filtering of the suspension deflection, but the effects of this filtering upon overall system behavior would have to be taken into account.

Possible ways of reducing the energy requirement of such systems are the aforementioned filtering of corresponding signals and the resultant slow adjustment conditions; defined adaptation of the gain depending on the ride (high during braking; otherwise low), or an FLLS that can be switched off and is activated only as needed.

These aspects, which for the sake of better comprehension will be referred to again in further detail in the course of the disclosure, along with mathematical observations, are the basis for the present invention, for which the point of departure is such that a fast-acting load leveler suspension system having passive spring-/damper components is in a position to compensate for low-frequency body movements, while high-frequency disturbances can be controlled by conventional passive components. However, this dictates a compromise in the damper characteristic, in order to avoid system instabilities. A high passive damping would therefore be absolutely necessary, which on the other hand means some sacrifices in terms of the comfort of the ride.

OBJECT AND SUMMARY OF THE INVENTION

It is accordingly an object of the present invention to devise an active motor vehicle suspension system including a fast-acting load leveler suspension system, which with few additional elements and with a suitably embodied closed loop controller is capable of effectively controlling both high-frequency natural wheel dynamics and low-frequency vehicle body motion, and with which, in a suspension system that is active to a certain extent, the dynamics of the ride can be decisively improved over that in conventional systems.

The invention attains this object and has an advantage that an effective active suspension system based on fast-acting load leveling (FLLS) is possible. The invention attains a compromise in the damper characteristic, in that active or so-called semi-active dampers are used, and in that case a combination of variable dampers, variable spring stiffnesses and an intelligent FLLS concept leads to notable improvements in terms of ride dynamics over conventional suspension systems.

Because of the necessary high damping in the open circuit (unregulated, passive damping, i.e., under open loop control), an active suspension based on an FLLS with simple position feedback is limited to low gain factors (slow reactions), and at the same time disadvantages in the isolation of the vehicle body mass from high-frequency interference must be accepted into the bargain. By means of active damper forces, as described, the system can be stabilized without affecting the isolation of the body; that is, the passive damping (wheel/body damping) could be reduced. If only the body is taken into consideration, then theoretically the passive damping could be ignored entirely; in actuality, however, it is found that a certain amount of passive damping (wheel damping) must be retained.

A combination of active and passive damping, which only to a limited extent need be capable of supplying energy (which demonstrably seldom has to be the case), or in other words, a semi-active damper, has virtually the same advantage as an active damper.

The invention describes systems, in further detail hereinafter, in which stable system behavior is assured by means of passive or active damping. In either case (passive or active damping), simplified third order systems are described. The first case, with passive damping, uses a regulating or closed loop control signal (suspension deflection) and an open loop control element (FLLS). However, such a combination means a system that can be only conditionally regulated and tends to be unstable. The second case, with active damping, then includes two control elements and two closed loop control signals, with the suspension deflection being used as the regulating variable for the FLLS and the absolute vertical velocity of the vehicle body being used as the regulating variable for the active damping. From the standpoint of closed loop control technology, this system represents an acceptable compromise in terms of overall system behavior, but it is still capable of futher improvement, considering that the simplified assumption of a third order system is not actually true for real systems, and that with increasingly high orders, the capacity for regulation becomes increasingly worse. In a further feature, the invention therefore encompasses the second case of active damping, augmented with a further feedback signal; that is, the absolute velocity signal that is already required, and therefore already present, for the active or semi-active dampers involved is additionally used for the fast-acting load leveling suspension (FLLS). In this case, the system is fully capable of closed loop control, and the system behavior can be varied arbitrarily, as will be explained hereinafter in conjunction with FIGS. 5 and 6. In considering a higher order system of this kind, once again a very good compromise for the overall adaptation is attainable. Decoupling of the wheel and body motion is assured by the characteristics according to the invention.

In such a form of an active suspension, a predetermined extent of passive damping, which is used for controlling the wheel motion, is still required for optimal adaptation. Additionally, a virtually ideal adaptation of the active suspension is attainable, along with the following main advantages of such a system:

Minimum number of regulating signals with full regulatability of the system (dual use of the absolute body velocity);

Simple proportional regulator, but in which the integral behavior is retained with respect to disturbances in the effective force on the body; that is, a static control deviation is precluded, so that the functional capacity of the conventional load leveler is retained in full;

The control of the system can be specified arbitrarily as a result of which the dynamic system behavior can be monitored arbitrarily; and centrifugal forces can be compensated for quickly;

The additional feedback of the velocity signal has no negative influence on the isolation of the body movement relative to roadway disturbances.

If the active control elements shut off or become defective, the vehicle remains operational; this affords the possibility of shutting off the active components, given suitable driving conditions and a corresponding basic adaptation, and thus saves energy.

Moreover, the fail-safe function of the system is assured in every instance.

In summary, the invention accordingly relates to an active suspension concept, based on the above-described use of the FLLS and active or semi-active damping, with closed-loop control of the suspension deflection and of the absolute vertical body velocity.

The invention will be better understood and further objects and advantages thereof will become more apparent from the ensuing detailed description of preferred embodiments taken in conjunction with the drawings.

DESCRIPTION OF THE PREFERRED EMBODIMENTS

In the ensuing description, the following three aspects will be explained in detail in terms of the design, basic concept and functions;

1) Load leveling with relative suspension deflection feedback; analysis and findings;

2) Load leveling with relative suspension deflection feedback and additional active damping feedback with body velocity ($V_{body}$); analysis and findings compared with 1) above;

3) Fast-acting load leveling (FLLS) with active damping and feedback of $V_{body}$ to both components and additional feedback of the relative suspension deflection to the leveling control component; analysis, findings and compared with 1) and 2) above.

Figure 2B:
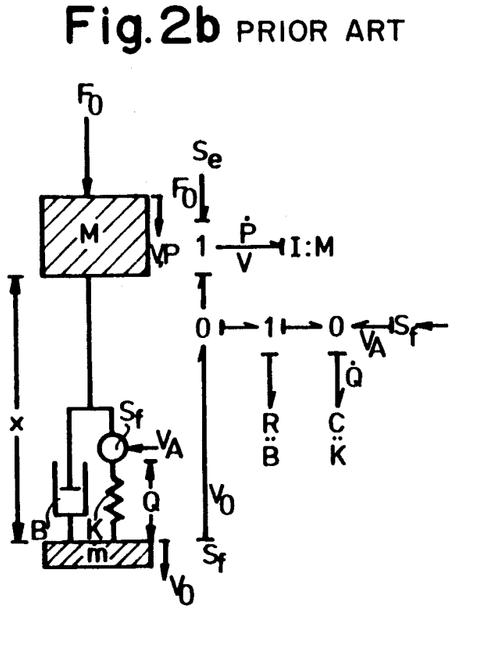
FIG. 2b is a schematic illustration that is common to both FIG. 1 and FIG. 2a, with an associated bond graph.

Load Leveling with Relative Suspension Deflection Feedback - Analysis and Findings In FIGS. 1, 2a and 2b, two possibilities of load leveling in motor vehicles are illustrated; in the drawings, the motor vehicle body is represented by the symbol M and the wheel by the symbol m (two-mass model: vehicle body/wheel).

In FIG. 1, an air suspension LF is supplied with a controlled volume flow rate $Q_A$ based on the action of a controller R, which is supplied with a relative travel/distance signal $x_{rel}$ by a travel or position sensor WS. A passive damper B is disposed parallel to the air suspension; the air suspension has a spring constant K, which occurs again as K' in a hydraulic positional compensation of FIG. 2a, which substantially corresponds to FIG. 1, with the exception that instead of the air suspension, a hydraulic leveling unit or control element HS is provided, which is supplied via a valve V acted upon by the controller R' with a corresponding flow $Q_B$ of pressure medium.

The flow of the quantity of pressure medium $Q_A$ is converted, for the purposes of the ensuing discussion, into a controlled relative velocity $V_A$ of the upper suspension point; in other words, the source of the volume flow rate is replaced by a relative velocity source element $S_f$ which provides the controllable relative velocity $V_A$.

For the sake of better comprehension, a further simplification is introduced, that is, that the dynamic influence of the wheel and tire is ignored; moreover, the wheel disturbance velocity $V_o$ is supplied directly to the lower suspension attachment point.

As long as an adequate passive damping is provided for controlling the wheel motion, this model is valid for frequencies above the natural body frequency but below the natural wheel frequency. It is assumed that in motor vehicle applications, the natural wheel frequency is nearly one order of magnitude higher than the frequency of the body. In the following section, the system shown in FIG. 1 or FIGS. 2a and 2b will be described in greater detail, in order to provide some understanding of various types of load leveling control with active suspensions.

Dynamics of the Open Loop System

The following state equations can be derived from FIG. 1 or FIGS. 2a and 2b and the associated bond graph:

$$\begin{bmatrix} \dot{P} \\ \dot{X} \\ \dot{Q} \end{bmatrix} = \begin{bmatrix} -B/M & 0 & K \\ -1/M & 0 & 0 \\ -1/M & 0 & 0 \end{bmatrix} \begin{bmatrix} P \\ X \\ Q \end{bmatrix} + \begin{bmatrix} 1 & B & 0 \\ 0 & 1 & 0 \\ 0 & 1 & 1 \end{bmatrix} \begin{bmatrix} F_o \\ V_o \\ V_A \end{bmatrix}. \quad (1)$$

Here, $V_A$ is positive during suspension deflection;

$X = V_o - V, \ Q = V_o + V_A - V.$

If S is taken as the Laplace transform variable, then the characteristic polynomial becomes:

$$\Delta = S(S^2 + BS/M + K/M). \quad (2)$$

The matrix of the transfer function is as follows:

$$\begin{bmatrix} P \\ X \\ Q \end{bmatrix} = \frac{\begin{bmatrix} S^2 & S(BS+K) & KS \\ -S/M & S^2 & -K/M \\ -S/M & S^2 & S(S+B/M) \end{bmatrix}}{\Delta} \begin{bmatrix} F_o \\ V_o \\ V_A \end{bmatrix} \quad (3)$$

A somewhat simpler form results if the body velocity of the motor vehicle is set to $V = P/M$ and a new version of $\Delta$ is defined:

$$\Delta' = S(MS^2 + BS + K). \quad (4)$$

The result is:

$$\begin{bmatrix} V \\ X \\ Q \end{bmatrix} = \frac{\begin{bmatrix} S^2 & S(BS+K) & KS \\ -S & MS^2 & -K \\ -S & MS^2 & S(MS+B) \end{bmatrix}}{\Delta'} \begin{bmatrix} F_o \\ V_o \\ V_A \end{bmatrix}. \quad (5)$$

A reduction in parameters can be attained by setting the undamped natural frequency at $$\omega_n = (K/M)^{\frac{1}{2}} \quad (6)$$

and the damping ratio to $$\zeta = B/2(KM)^{\frac{1}{2}} \quad (7)$$

By dividing the numerators and the denominator of equation (5) by $K \cdot \omega_n$ and using the nondimensional frequency variable $$s = S/\omega_n \quad (8)$$

then the following is obtained:

$$\begin{bmatrix} V \\ X \\ Q \end{bmatrix} = \frac{\begin{bmatrix} s^2 \omega_n/K & s(2\zeta s + 1) & s \\ -s/K & s^2/\omega_n & -1/\omega_n \\ -s/K & s^2 \omega_n & s(s+2\zeta)/\omega_n \end{bmatrix}}{s(s^2 + 2\zeta s + 1)} \begin{bmatrix} F_o \\ V_o \\ V_A \end{bmatrix} \quad (9)$$

With the exception of the required dimensional parameters in the numerators, this form contains only the damping ratio as a parameter.

Stability with Deflection Feedback

The following discussion considers a simple load leveling scheme in which the deflection X of the suspension is fed back by means of a simple proportional gain g.

$$V_A = gX, \ V_B = o. \quad (10)$$

The procedure is such that equation (10) is substituted into the second equation of equation (5). The result is:

$$X = \frac{-SF_o + MS^2 V_o}{\Delta' + Kg} = \frac{-SF_o + MS^2 V_o}{MS^3 + BS^2 + KS + Kg} \quad (11)$$

If these results are used in equation (10) or (11) and then substituted in equation (5), the result is the following closed loop transfer function matrix:

$$\begin{bmatrix} V \\ X \\ Q \end{bmatrix} = \frac{\begin{bmatrix} S^2 & BS^2 + KS + Kg \\ -S & MS^2 \\ -(S+g) & MS(S+g) \end{bmatrix}}{(MS^3 + BS^2 + KS + Kg)} \begin{bmatrix} F_o \\ V_o \end{bmatrix} \quad (12)$$

If equations (6) through (8) are used and $g'$ is set as follows:

$$g' = g/\omega_n$$

and if the numerator and denominator terms are divided by $K \cdot \omega_n$, then the normalized version is arrived at:

$$\begin{bmatrix} V \\ X \\ Q \end{bmatrix} = \frac{\begin{bmatrix} s^2 \omega_n/K & 2\zeta s^2 + s + g' \\ -s/K & s^2/\omega_n \\ -(s+g')/K & s(s+g')/\omega_n \end{bmatrix}}{s^3 + 2\zeta s^2 + s + g'} \begin{bmatrix} F_o \\ V_o \end{bmatrix} \quad (13)$$

The transfer functions $X/F_o$ indicates a zero deflection in the steady state for constant loads $F_O$ supplied, which corresponds to the desired load leveling effect. The velocity at which this load leveling effect can occur will now be considered, or the permissible gain values $g$ or $g'$.

The effects of the gain variations can best be ascertained by plotting the root locus curves of the characteristic polynomials:

$$s(s^2 + s\zeta s + 1) + g' = O \quad (14)$$

If this condition is considered from the standpoint of closed loop control technology, then the result in the nonregulated case is three poles (open loop poles) and no zero point.

Figure 9:
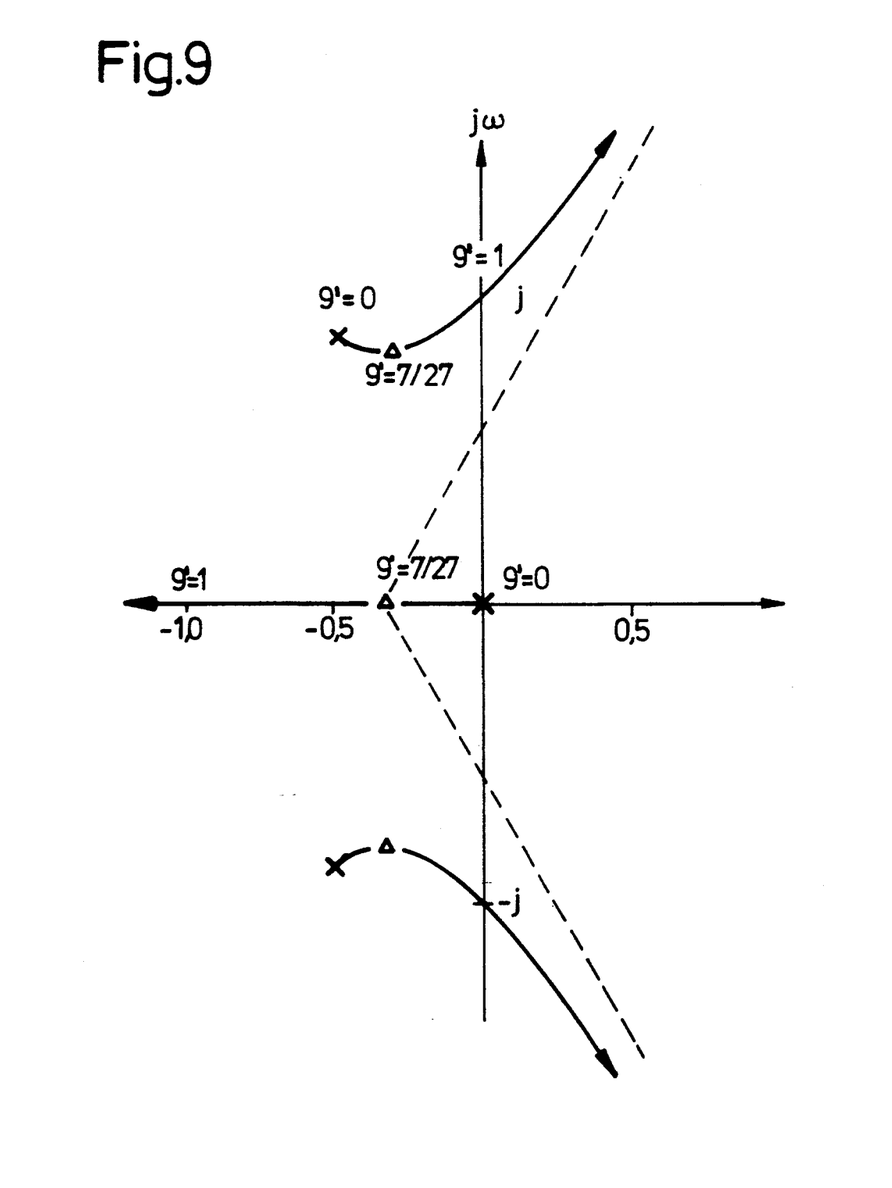
FIG. 9, in the form of a diagram, shows a root locus curve.

FIG. 9 shows the applicable root locus curve course. Based on the normalized characteristic polynomial of equation (14), the three open loop poles are located at $$s = O, -\zeta \pm j(1-\zeta^2)^{\frac{1}{2}} \quad (15)$$

and in FIG. 9 are shown for the case where $\zeta = 0.5$.

Figure 10:
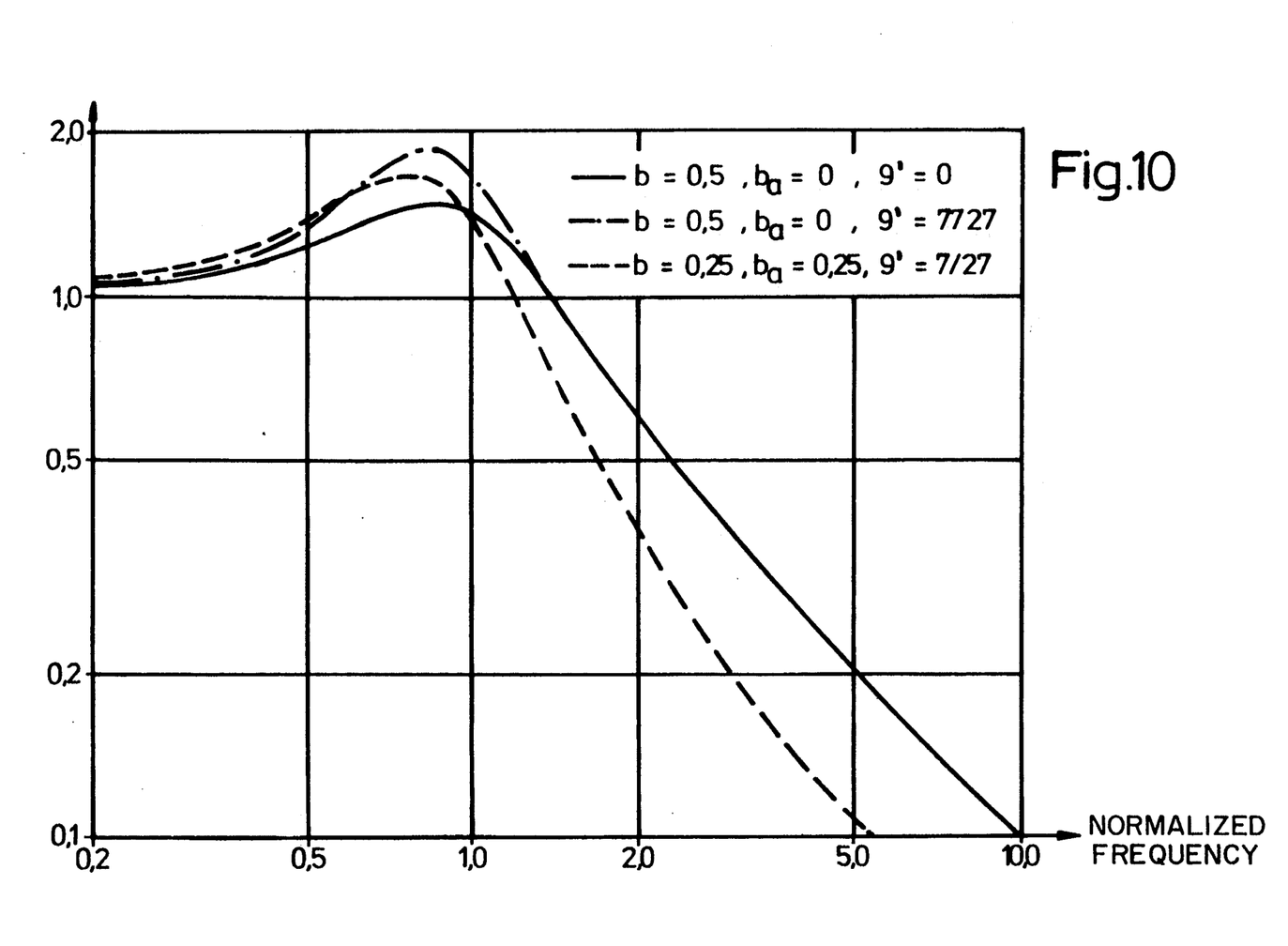
FIG. 10 shows the normalized frequency response corresponding to FIG. 7 in three possible exemplary embodiments.

For higher values of $g'$, a root moves outward along the negative real axis, and the complex root pair moves in the direction of the asymptotes, indicated with dashed lines. These asymptotes extend outward from the center of gravity of the pole configuration in an open loop at $$c.g. = 2\zeta/3 \quad (16)$$

in general, and in the exemplary embodiment shown in FIG. 10 at $-\frac{1}{3}$.

The real pole near the origin for low $g'$ values is related to the slow reduction with static deflection, resulting from a steadily applied load in conventional level regulating systems. The oscillatory poles describe the low-pass filter effect of roadway disturbances in conventional passive suspensions.

If $g'$ is increased, then the reaction speed, which is due to the real root, also rises, but the complex-conjugated poles initially diminish in frequency and damping and then rise in frequency again, but become increasingly less in damping, until the system becomes unstable at $g' = 1$.

It can therefore be demonstrated that the real pole at location $\sigma_r$ and the real portion of the complex pair at $\sigma_p$ obeys the following rule:

$$\sigma_r + 2\sigma_p = -2\zeta. \quad (17)$$

This shows that whenever $\sigma_r$ is made more sharply negative, for higher reaction speeds, the real portions of the complex poles must become more sharply positive. The small triangles (in the drawing in FIG. 9) represent the case in which the real portions are equal. This happens when $$\sigma_r = \sigma_p = -2\zeta/3 \quad (18)$$

which produces the same value as in equation (16). The gain for this purpose, in the exemplary embodiment shown in FIG. 9, is at $g' = 7/27$. This is a kind of optimal gain, because lesser gains result in a slower reaction of the real root, while greater values result in a slower fading of the oscillations or vibrations that are associated with the complex roots. Quite unequivocally, the introduction of a fast-acting load leveling suspension reduces the damping of the complex pole pair.

This discussion of the root locus curves shows that similar active systems can be designed that utilize the systems of FIG. 1, or of FIGS. 2a and 2b with appropriate adaptation. In both cases, the level regulation reduces the damping and can lead to instability if the damping is initially set too low. That could mean that a device or sensor detecting such an error would be required, which would shut off or prevent the load leveling action if the system became unstable, or that could adapt the gain to account for deteriorating damping. A positive aspect of this kind of active suspension is that a conventional passive suspension remains whenever the influence of the load leveling control is shut off; the result is a fail-safe system.

Power Reduction Techniques

A load leveler active suspension, in its simplest form, reacts to all aspects of suspension deflection, although its main advantage lies in its ability to eliminate low-frequency deflections due to static loads or maneuver-induced forces. Thus, it is logical to filter out higher frequency components in the deflection range that are due to wheel motion. A simple low pass filter with a break frequency near the wheel bounce frequency will reduce power if the sensed deflection is first put through the filter before activating the leveling mechanism. The filtering action can be done electronically or even mechanically in a valve mechanism.

A more innovative means to reduce power requirements may be to use a gain scheduling technique in which under certain conditions the gain is reduced or the system is even switched off until it is really needed. The criteria for using a high gain setting could involve the magnitude of suspension deflection, brake pressure, lateral acceleration, steering wheel angular rate, and the like. Such a system will expend stored energy only a small fraction of the operating time of a typical vehicle.

Accordingly, a conclusion can be drawn that load leveling active suspensions can eliminate low-frequency suspension deflections due to external loads or maneuvering forces. Thus, such suspensions have the potential of controlling and regulating the rigid body vehicle motions such as pitch and roll as well as generating or enabling command inputs to change front and or, rear ride height for aerodynamic or other reasons. The higher frequency disturbances from roadway unevenness are filtered by passive compliance and damping elements.

In this way, the load leveler acts much like an integral action controller or regulator and exhibits stability problems if the feedback gain is too high relative to the suspension damping. This suggests that the load leveler gain should be varied as the damping is varied in a variable damping suspension. Furthermore the use of semi-active damping may allow high damping of body motions and thus fast load leveling without excessive transmission of disturbances from wheel motion.

Although an active suspension using fast load leveling would seem to require a large power expenditure, there are a variety of techniques to reduce the power required and to keep it low. Some techniques simply reduce the effect the high frequency wheel motion has on the leveling mechanism. Other methods can be used in conjunction with electronically controlled stiffness and damping to vary the load leveler gain or switch off the leveler action. In this way the active suspension can be constructed to use very little energy on the average and yet is able to respond vigorously using stored energy in critical situations.

The combination of semi-active damping control, variable stiffness and damping elements, and a sophisticated fast load leveler can therefore produce an active suspension of a new type with many advantage over constant passive suspensions and yet with desirable low power requirements and a softer suspension.

Figure 3:
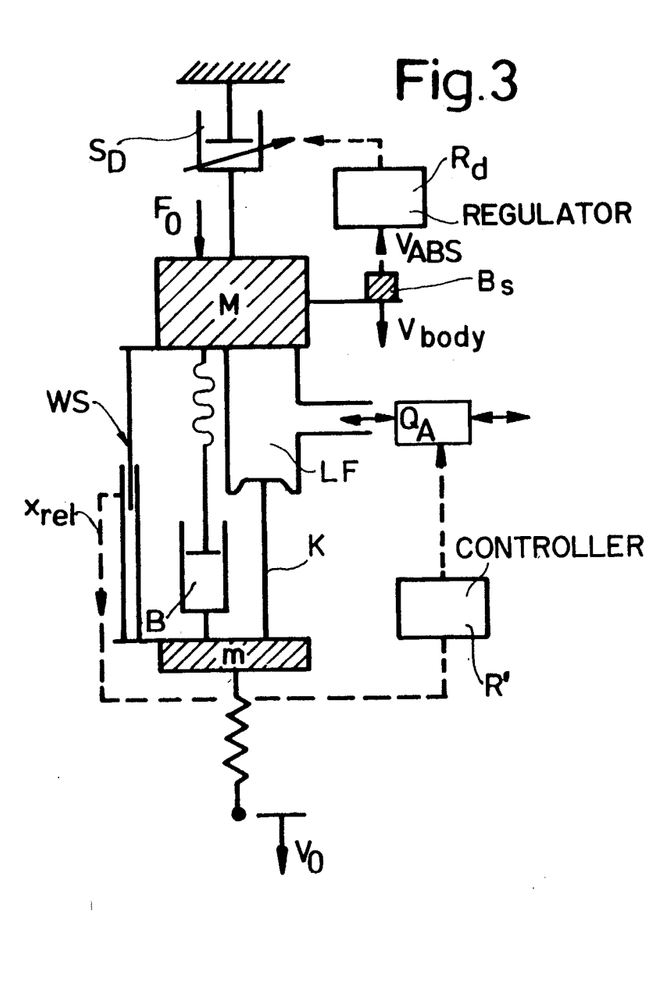
FIG. 3 shows a first embodiment of an active suspension system using an active "skyhook" damper.
Figure 4:
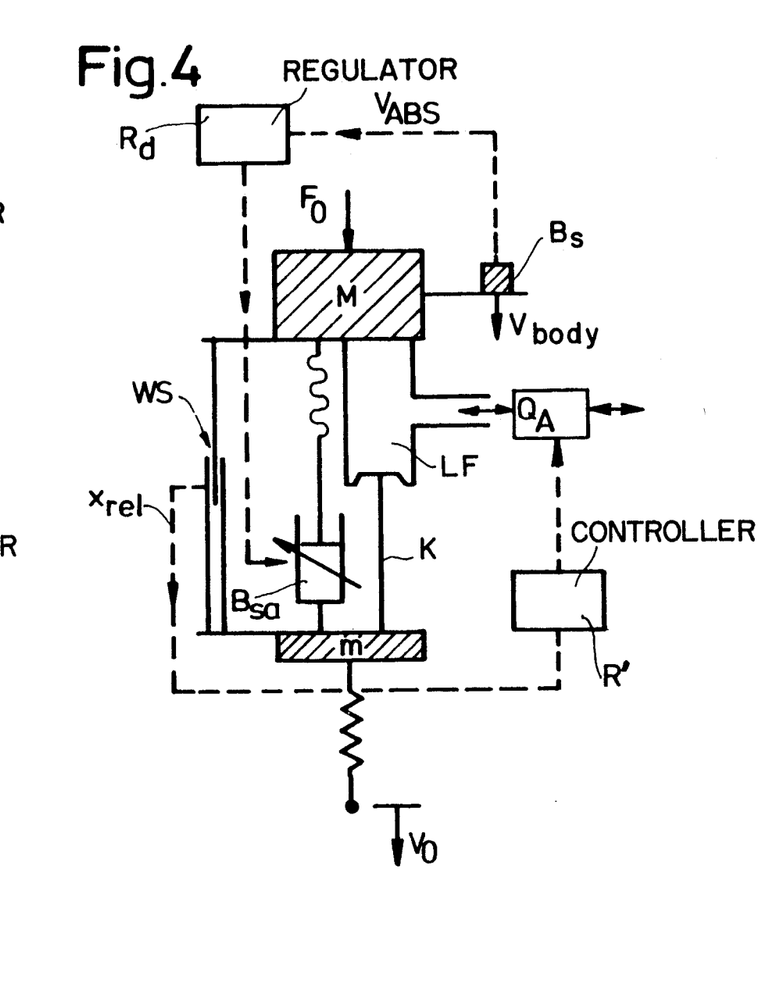
FIG. 4 shows a suspension system in a view comparable to FIG. 3, showing a semi-active damper and likewise separate closed loop control of the damping properties, on the one hand, and of the suspension and load leveling properties, on the other.

Load Leveling with Relative Suspension Deflection Feedback and Inclusion of Additional Active Damping with Body Velocity Feedback and Comparison with Above Concepts The illustrations in FIGS. 3 and 4 show simplified suspension systems, but with the inclusion of an active damping with the coefficient $B_A$. As shown in FIG. 3, this can be a classical "skyhook damper", which impresses a force on the mass proportional to its absolute velocity V. If this force were to be realized by the suspension, an active force generator would be required, and an extra component of force would also react on the wheel and tire.

The term "skyhook damper" is found in the literature and is defined as an inertially mounted damper, acting solely on the vehicle body and counteracting the vertical body motion, which is replaced by a variable damper between the wheel and the body. The variable damper provides a certain amount of passive damping force which is proportional to the relative velocity across the damper. In addition, the passive damping force level can be varied proportionally to the absolute body vertical velocity. Such body velocity can be directly sensed by an absolute body velocity sensor, or by sensing the body acceleration and providing adequate signal processing to calculate absolute body velocity.

The described variation of the damping force level according to the absolute body vertical velocity yields the same effect as the above-noted inertially mounted damper. The damping force can be described as:

$$F_D = B_{SH} * V_{ABS} + B * V_{rel}$$

wherein $B_{SH}$ is the skyhook damping factor, B is the passive damping factor, $V_{ABS}$ is the absolute vertical body velocity, and $V_{rel}$ is the relative velocity across the damper.

However, a so-called semi-active damper, which is considered to be known per se and is described in the aforementioned European Patent (A) 0197316, can also be used.

Both FIGS. 3 and 4 relate to the combination of an air suspension system mechanical or hydraulic suspension system, but an air suspension system is shown, combined with at least partly active damping means. Once again, travel or position sensors WS are provided, which supply a load leveling controller—which may be a fast-acting load leveling suspension or FLLS—with the prevailing position signal $x_{rel}$.

Independently, an absolute velocity signal $V_{abs,body}$ (symbol means "absolute body velocity") is supplied to a separate damping controller Rd by a velocity sensor GS. The active skyhook damper selectively utilizes first passive damping means B and the active skyhook damper SD as seen in FIG. 3, while the output signal of the damping controller RD, in the suspension system having semi-active damping, is supplied to a semi-active damper $B_{sa}$ as seen in FIG. 4.

The modified state equation for the suspension system of FIGS. 3 and 4, corresponding to equation (1), is:

$$\begin{bmatrix} P \\ X \\ Q \end{bmatrix} = \begin{bmatrix} -(B+B_A)/M & 0 & K \\ -1/M & 0 & 0 \\ -1/M & 0 & 0 \end{bmatrix} \begin{bmatrix} p \\ x \\ Q \end{bmatrix} + \begin{bmatrix} 1 & B & 0 \\ 0 & 1 & 0 \\ 0 & 1 & 1 \end{bmatrix} \begin{bmatrix} F_o \\ V_o \\ V_A \end{bmatrix}.$$

The characteristic polynomial is then $$\Delta = S(S^2 + (B+B_A)/M + K/M) \tag{20}$$

and the equivalent of the transfer function matrix, equation (3), is $$\begin{bmatrix} P \\ X \\ Q \end{bmatrix} = \begin{bmatrix} S^2 & S(BS+K) & KS \\ -S/M & S(S+B_A/M) & -K/M \\ -S/M & S(S+B_A/M) & S(S+(B+B_A)/M) \end{bmatrix} \begin{bmatrix} F_o \\ V_o \\ V_A \end{bmatrix} \tag{21}$$

The slightly simpler versions corresponding to equations (4) and (5) are $$\Delta' = S(MS^2 + (B+B_A)S + K) \tag{22}$$

$$\begin{bmatrix} V \\ X \\ Q \end{bmatrix} = \begin{bmatrix} S^2 & S(BS+K) & KS \\ -S & S(MS+B_A) & -K \\ -S & S(MS+B_A) & S(MS+B+B_A) \end{bmatrix} \begin{bmatrix} F_o \\ V_o \\ V_A \end{bmatrix} \bigg/ \Delta' \tag{23}$$

Repeating the analysis already performed above, the closed loop transfer function matrix corresponding to equation (10) becomes:

$$\begin{bmatrix} V \\ X \\ Q \end{bmatrix} = \frac{\begin{bmatrix} S^2 & BS^2 + KS + Kg \\ -S & S(MS + B_A) \\ -(S+g) & (MS + B_A)(S+g) \end{bmatrix}}{MS^3 + (B + B_A)S^2 + KS + Kg} \begin{bmatrix} F_o \\ V_o \end{bmatrix} \quad (24)$$

Using equations (6)-(8) and $$\zeta_a = B_A/2 \ (KM)^{1/2}, \ g' = g/\omega_n, \quad (25)$$

new normalized transfer functions can be found:

$$\begin{bmatrix} V \\ X \\ Q \end{bmatrix} = \frac{\begin{bmatrix} s^2\omega_n/K & 2\zeta s^2 + s + g' \\ -s/K & s^2/\omega_n + 2\zeta_a s/\omega_n \\ -(s+g')/K & (s + 2\zeta_a)(s+g')/\omega_n \end{bmatrix}}{s^3 + 2(\zeta + \zeta_a)s^2 + s + g'} \begin{bmatrix} F_o \\ V_o \end{bmatrix} \quad (26)$$

The characteristic polynomial for the closed loop case corresponding to equation (14) is then $$s(s^2 + 2(\zeta + \zeta_a)s + 1) + g' = o \quad (27)$$

A comparison of equation (14) with equation (27) shows that the introduction of active damping has not changed the root locus curve very much, except that the open loop poles are damped by a combination of active and passive damping. Also, there are various changes to the numerators of the transfer functions in equation (26), caused by the introduction of active damping. Some of the most significant effects can be found by computing the frequency response functions.

Frequency Response Calculations

Although the root locus curve course is identical in the active and passive cases, if $\zeta$ in the passive case is identical to $\zeta + \zeta_a$ in the active case, the response to roadway inputs is different, since the numerators of some transfer functions are different. For example, the transfer function relating mass velocity V to the input velocity $V_o$ is $$\frac{V}{V_o} = \frac{2\zeta s^2 + s + g'}{s^3 + 2(\zeta + \zeta_a) s^2 + s + g'} \quad (28)$$

The root locus curve of FIG. 9 applies if $\zeta + \zeta_a = 0.5$, but the frequency response function varies depending on how much of the total damping is supplied by the passive damping $\zeta$ alone. For this case, the value $g' = 7/27$ still represents an optimal load leveler gain, in which the time constants of the three roots are matched.

FIG. 10 shows the magnitude of equation (28) for a sinusoidal input at a range of normalized frequencies. Three cases are shown. First, if $g' = 0$, there is no load leveling at all, and the suspension is a conventional passive suspension with a rather high damping ratio of 0.5. The curve course or reaction of the suspension falls off rather slowly above the natural frequency, indicating fairly poor high-frequency isolation, or a harsh ride. For this reason, most passive suspensions use less damping and accept more gain near the response frequency as part of the compromise to be made here. As the root locus curve course shows, however, a reduction in open loop pole damping leads to a greater restriction of the $g'$ value and a slower load leveling response, since the introduction of load leveling tends to reduce the system damping with increasing gain, and the speed of response of the real root increases.

This effect is clearly seen in the curve course for the values of $\zeta = 0.5$, $\zeta_a = 0$, $g' = 7/27$ in FIG. 10. As the root locus curve course of FIG. 9 shows, the optimum closed loop poles have a lower natural frequency and reduced damping, compared to the open loop poles. Thus, although this active system has the advantage of zero static deflection and only a moderate increase in resonant response, the high-frequency isolation is a compromise because of the large passive damping required.

However, if the total damping is shared by the active and passive components, considerable improvements are attained. The curve courses of FIG. 10 show that when $\zeta_a = \zeta = 0.25$, both the resonance is reduced and the high-frequency isolation is improved. This is because only the value $\zeta$ appears in the numerator of equation (28). A suspension designed along these lines therefore has excellent isolation properties as well as zero static deflection. The load leveler can be helpful in controlling roll and pitch in transient maneuvers, and the static ride height could be programmed in at fairly high rates.

Accordingly, the conclusion can be drawn that an active suspension based on load leveling and simple deflection feedback is limited in the speed of its response by the damping in the open loop system. If the damping is generated completely passively in this case, then the high-frequency isolation properties of the suspension are compromised, just as is the case for simple passive suspension. However, the system can be stabilized by active damping forces, which do not impair the high-frequency isolation. As a result, an active damping is very advantageous for this type of active suspension.

Considering only the transfer functions of equation (28), the conclusion can be drawn that it would be desirable not to have any passive damping at all. Based on the analysis here involving only a single degree of freedom, this conclusion is correct; however, more complex models show that some passive damping is necessary. This logically leads to the use of semiactive dampers, which generate a damping force having active and passive components, because the suspension force representing the sum of active and passive forces supplies power to the suspension system relatively infrequently. Thus a semi-active damper which can generate only forces resulting in the dissipation or destruction of power is in a position to supply most of the advantages and benefits of an active damper, without requiring external power. Such a semi-active damper can thus complement the use of a load leveler incorporating appropriate power-reduction techniques.

The active suspension concepts analyzed above also include active and passive damping, for the sake of stability. It will now be shown that the addition of a feedback of the isolated mass velocity to the leveler control load has several advantages. First, the integral control behavior—zero static deflection under load changes—is maintained. Furthermore, stability is enhanced; in fact, arbitrary closed loop poles can be achieved. Finally, there is no degradation in the isolation of high frequency roadway disturbances. By arranging block diagrams of the standard control system form and using pole placement synthesis techniques, a nearly ideal suspension is constructed, which performs well even when the leveling action is disabled.

The findings thus far can be summarized as follows:

In the foregoing, the simplest form of active suspension based on a load leveler with suspension deflection feedback has been analyzed. It was found that the load leveling action produced a system with less-effective damping than with an originally passive damping. An active damping concept was also introduced into this system. This permits a reduction in passive damping and allows an improvement in the isolation of high frequency roadway disturbances. In practical exemplary embodiments, it can also be assumed that most of the benefits of active damping can be achieved with a semi-active damper.

However, the suspension systems studied so far represent compromises, in part because of the elementary nature of the feedback schemes used. There are not enough coefficients in the control laws used to adjust the system dynamics completely. The two parameters g and $B_A$ are not capable of arbitrarily influencing the three independent coefficients of the characteristic equation of the third order system model. The result is that some aspects of suspension performance must be compromised, in order to achieve a reasonable degree of stability in the closed loop system.

Accordingly, a further feedback coefficient will now be introduced according to the invention, by establishing a feedback of isolated mass velocity V to the leveler mechanism. There are several reasons for using V as the feedback signal. First, it is the same quantity needed for the active or semi-active damper. Thus an additional sensor or observer is not required. Secondly, this additional term in the control law does not destroy the zero static deflection behavior of the suspension. Finally, this feedback does not adversely affect the isolation of the suspended mass from roadway disturbance inputs.

With this type of active suspension, the major disadvantage in the isolation (between the vehicle body and the wheel) is the required amount of passive damping needed to control wheel motion. Otherwise, nearly ideal performance of this active suspension is possible. The ensuing discussion illustrates this possibility. The suspension makes only limited power demands and reverts to reasonable passive suspension in the event of failure in the active parts or when the active parts are disabled to save energy.

Fast-Acting Load Leveling Suspension (FLLS) with Active Damping and Feedback of Absolute Body Velocity to Both Components and Additional Feedback of the Relative Suspension Deflection to the Load Leveling Component - Analysis as Compared with Cases 1) and 2)

Figure 5:
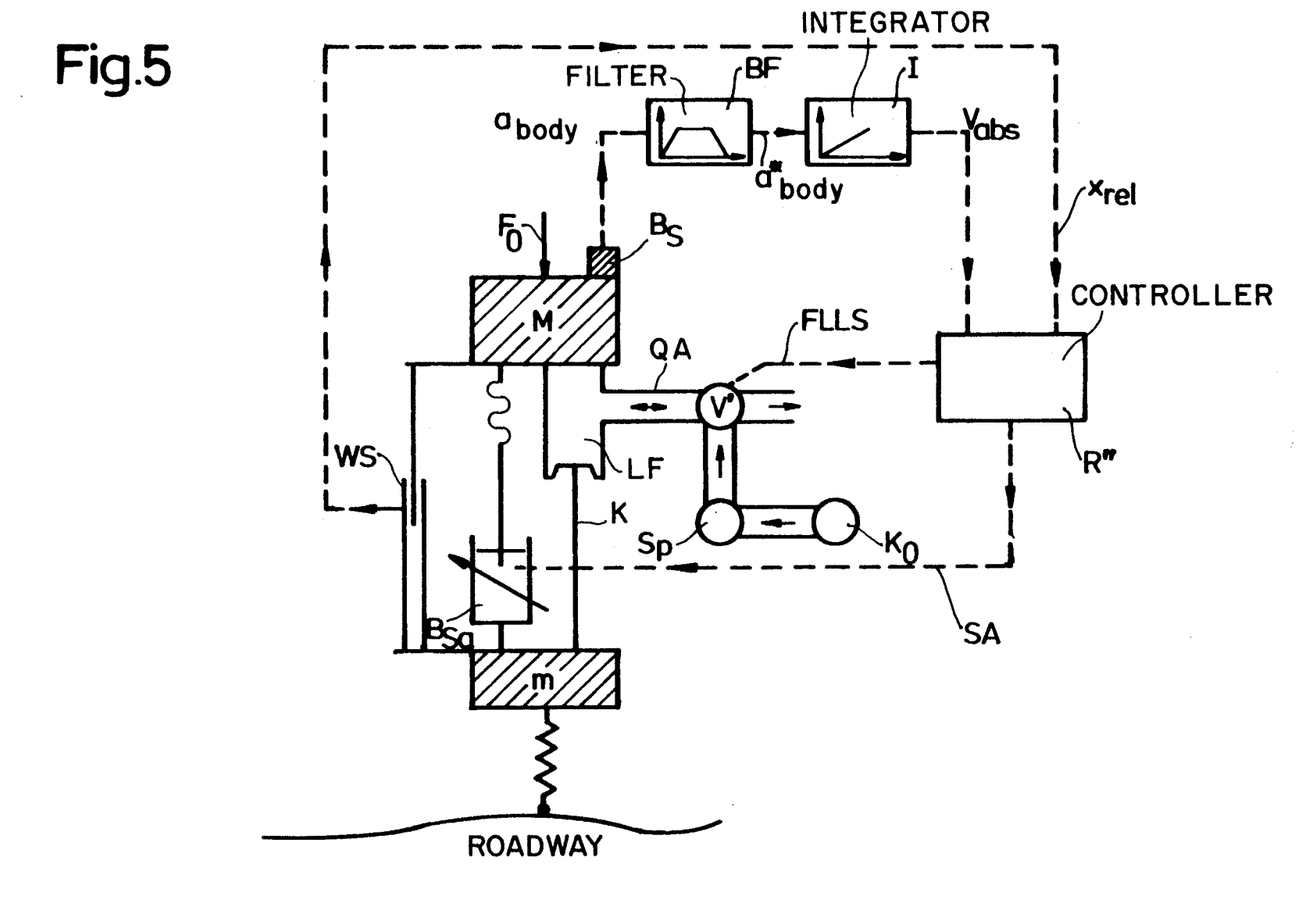
FIG. 5 is a complete illustration of the overall concept according to the invention in schematic form with a shared regulator (or closed loop controller), which acts on both existing active control elements between the wheel suspension and the body.
Figure 6:
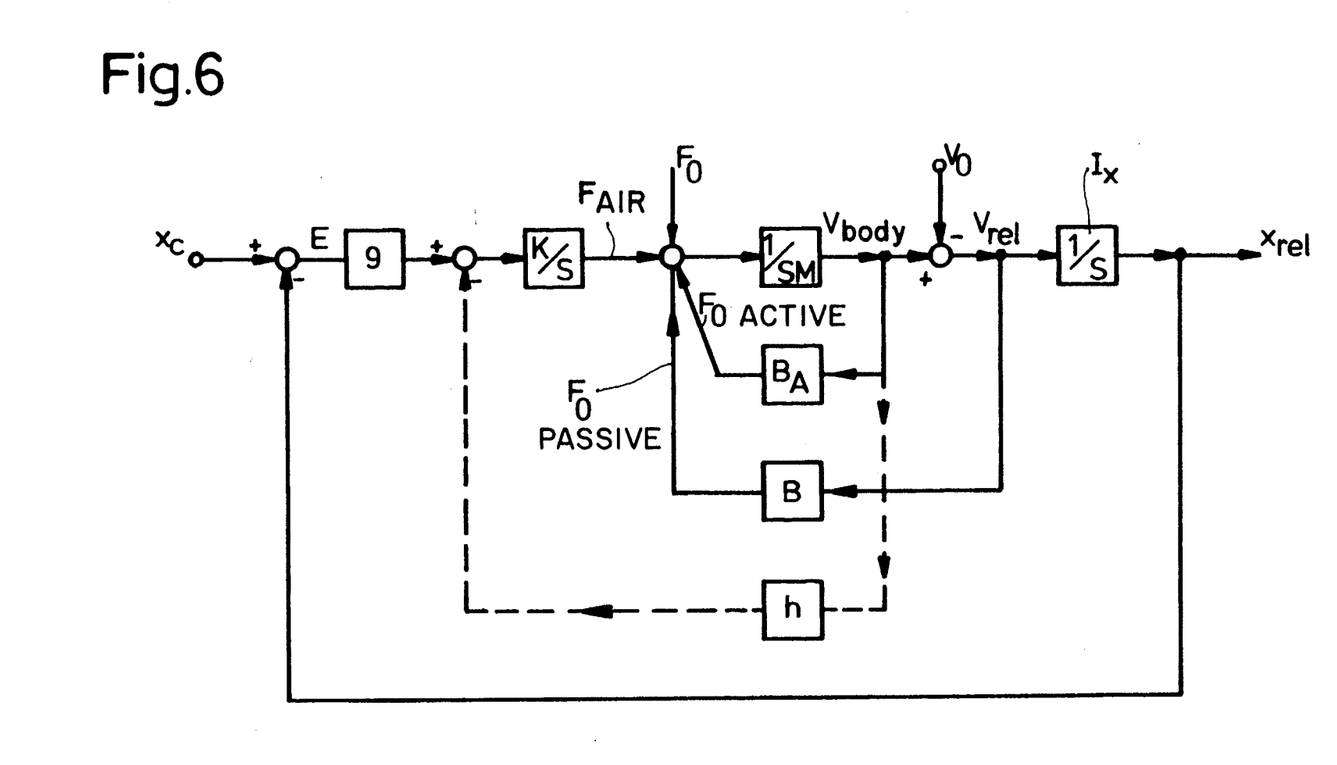
FIG. 6 is a block circuit diagram of the closed loop control scheme of a simplified third order system having air suspension as shown in FIG. 5.
Figure 7:
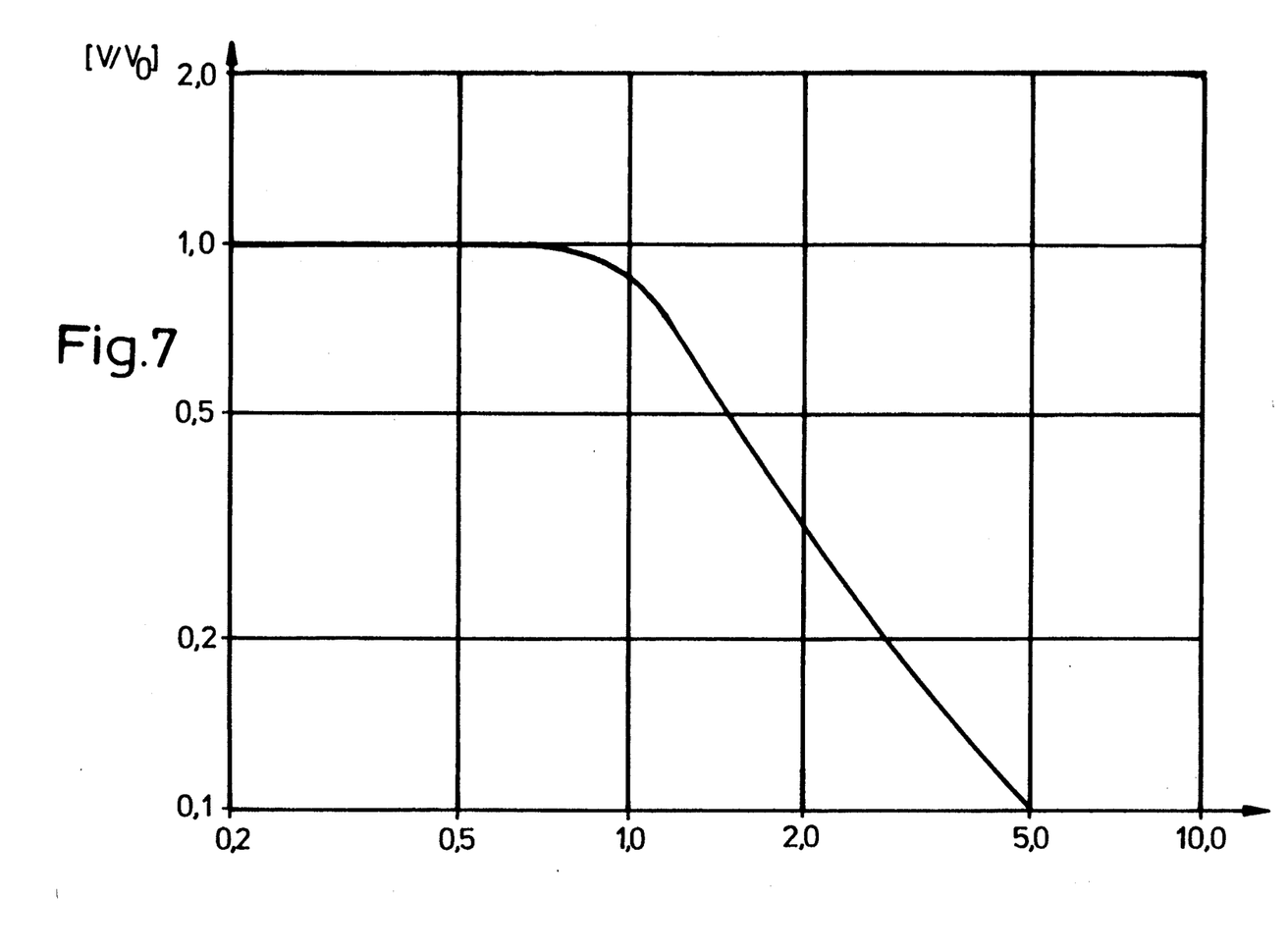
FIG. 7 is the normalized frequency response curve for a suspension concept as it derives from the illustration in FIG. 4.

In FIG. 5, a linearized and highly schematic system model of such a suspension system is shown; FIG. 6 is the block diagram of the closed loop of this third order system having air suspension and semi-active damping without taking wheel dynamics into account, but with specification of the suspension deflection and feedback of the absolute velocity. FIG. 7 shows the advantageous course of the frequency response in such a suspension system, especially by comparison with the curve courses relating to the above-discussed system and shown in FIG. 10.

The basic structure of the complete embodiment of the invention shown in FIG. 5 is similar in principle to the embodiment of FIG. 4 and includes, in addition to the body mass M, the wheel mass m, the semi-active damper $B_{sa}$ and the air suspension LF having a spring constant K that is part of the FLLS apparatus, a controller R'', which in this case is shared.

The FLLS apparatus (air suspension) here is augmented with a reservoir Sp, which is acted upon by a compressor Ko and acts upon the air suspension LF via a control valve V' controlled by the controller by means of a first FLLS signal. A second regulating signal SA reaches the semi-active damper $B_{Sa}$ from the controller, to which as in the above discussion the position sensor WS supplies the relative suspension deflection $x_{rel}$, as well as an absolute body velocity signal $V_{abs}$ in this case derived from an acceleration sensor $B_S$. The output signal $a_{body}$ of the acceleration sensor $B_S$, via a band filter BF, arrives in the form of a signal $a^*_{body}$ at an intergrator I, which generates the absolute velocity signal $a_{bs}$.

The signal ($V_{abs}$) and the signal ($X_{rel}$) are directed into the controller R'' as shown in FIG. 5 and a signal FLLS is directed as an output signal from the controller R'' to the control element LF. The signal $V_{abs}$ is directed into the controller R'' and an output signal SA from the controller R'' is directed to the control element ($B_{sa}$) to control the control element ($B_{sa}$).

the damping force then becomes $$F_D = F_D(x_{rel}, V_{abs}, (V_{rel})),$$

and the force of the air spring becomes $$F_L = F_L(x_{rel}, V_{abs}).$$

The block diagram, FIG. 6, of the stage variables that belongs to the simplified system model of FIG. 5, which includes the controller, the controlled system and the feedbacks, includes an integrator $I_x$, which from its input variable corresponding to $V_{rel}$ (suspension deflection rate x) generates the controlled output variable $x_{rel}$ (relative suspension deflection). An input variable $x_c$ is defined as a guide variable, as is an error variable E; a velocity feedback is introduced, which acts via the gain h. The variables $F_o$ and $V_o$ appear as disturbance variables; the influence of the semi-active damper is divided into the two variables $B_A$ and B, which participate in the feedback loops about the block 1/SM and therefore assure damping of the roots that are capable of oscillation. Block $B_A$ reacts only to the variable for absolute body velocity $V_{abs}$, while block B reacts to the variable $V_{abs} - V_o$.

From FIG. 6, it is also clear that the effect of the integrator on the block K/S is active. This means that although the deflection is only under proportional control, there is an integral control effect due to the nature of the open loop system. The feedback of V does not change the fact that the deflection error must go to zero in the steady state, since V disappears in equilibrium as long as $V_o$ has no steady state component. This means that V must not be defined as an absolute velocity with respect to an arbitrary inertial coordinate frame, but rather as a velocity with respect to an average roadway profile for which $V_o$ vanishes in the average.

The closed loop properties of the suspension system can be derived using the block circuit diagram of FIG. 6; however, because of the several interwoven loops here, it is simpler to use the above-derived transfer function matrix results. If the guide variable $x_c$ is set to zero, for the sake of simplicity, then equation (10) above can be relaced as follows:

$$V_A = gX - hV, \quad V_B = 0 \tag{29}$$

Using equation (22) and the first two equations of equation (23), $$\Delta'V = S^2 F_o + S(BS+K)V_o + KS(gX - hV) \tag{30}$$

$$\Delta'X = -SF_o + S(MS + B_A)V_o - K(gX - hV) \tag{31}$$

If these pairs of equations are solved simultaneously and the expressions for V and X are used with the last equations for Q in equations (22) and (23), six transfer functions corresponding to equation (24) are found. In this case only the two most important transfer functions are examined.

$$\frac{V}{V_o} = \frac{BS^2 + KS + Kg}{MS^3 + (B + B_A)S^2 + K(1+h)S + Kg} \tag{32}$$

$$\frac{X}{F_o} = \frac{-S}{MS^3 + (B + B_A)S^2 + K(1+h)S + Kg} \tag{33}$$

These findings reduce to those given in equation (24), if h=0.

It should be noted that the numerators of these transfer functions are not influenced at all by h. (However, this is not true for all transfer functions.) However, the three parameters q, h and $B_A$ can be used to give arbitrary values to three of the four denominator coefficients. This means that arbitrary closed loop poles can be achieved by this feedback scheme, or that the system is "controllable" in the control theory sense.

The single S in the numerators of equation (33) means that the static deflection vanishes for steady loads. The term $BS^2$ in equation (32) means that the high-frequency isolation is determined only by the amount of passive damping. If equations (6) to (8) and equation (25) are used once again, nondimensionalized versions of these transfer functions are found. (The parameter h is also already nondenominational.)

$$\frac{V}{V_o} = \frac{2\zeta s^2 + s + g}{s^3 + 2(\zeta + \zeta_a)s^2 + (1+h)s + g'} \tag{34}$$

$$\frac{X}{F_o} = \frac{-s/K}{s^3 + 2(\zeta + \zeta_a)s^2 + (1+h)s + g'} \tag{35}$$

These results can be compared with the terms in equation (36). The control parameters are q' and h, as well as the active damper ratio $\zeta_a$.

Synthesis of Optimal Suspensions

A typical optimal control problem involves stating a function with formal criteria (usually a quadratic function) to be minimized. In the linear case, the result is that the controllable input or inputs are found to be a sum of gains, multiplied by the system state variables. The suspension system discussed above fits this pattern in a general way. The load leveler input is influenced by the state variables X and V (or P), and the active damper provides a force input that is also proportional to V. Since the force input occurs at a different point in the open loop system than the load leveler velocity input, the system is controllable even if only two of the three state variables are involved in the control. This particular scheme enables an integral control action, which is generally not the case with state variable feedback to a single control input. The load leveler action would be destroyed, for example, if Q were included in the determination of $V_a$ or $V_B$.

Many studies have already been made, attempting to apply optimal control techniques to vehicle suspensions. From these studies, a concept of active damper action arises, and in many cases it has been found that a damping ratio of 2/2 is optimum for oscillatory roots. However, the integral action that eliminates static deflection included here as well. In the suspension concepts discussed thus far, the load leveling integral action is necessary not only in order to take load variations into account, but also to help control rigid body motions such as pitch and roll due to braking, accelerating and turning maneuvers.

The approach taken here is based on the selection of closed loop pole locations based on the above-discussed considerations, and then finding values of $\zeta_a'g'$ and h, which yield these poles. The resulting system may or may not then be ideal in a formal sense, but if the pole locations are reasonably selected, the suspension concept will at least behave reasonably.

It has already been pointed out above that an optimal system results if the real values of all three poles are equal. It was also found that the frequency of the oscillatory poles did not change very much for moderate values of $B_A$ and q (or $\zeta_a$ and q'). In principle, it is better to set the natural frequency of the suspension by adjusting the passive spring constant K, rather than by using a closed loop control system. Under these conditions, the following denominator is selected for the closed loop transfer functions:

$$(s^2 + 2\zeta_d s + 1)(s + \zeta_d) = s^3 + 3\zeta_d s^2 + (1 + 2\zeta_d^2)s + \zeta_d. \tag{36}$$

In equation (36), $\zeta_d$ can be considered an ideal damping ratio for the closed loop oscillatory poles. The real parts of all three poles lie at $s = -\zeta_d$, and the undamped natural frequency remains unity. (In the non-normalized case, $\omega_n = (K/M)^{\frac{1}{2}}$.)

When the coefficients in equation (36) are compared with those in the denominator of the polynomial equations (34) or (35), a series of relationships emerges.

$$g' = \zeta_d, \tag{37}$$

$$1 + h = 1 + 2\zeta_d^2, \tag{38}$$

$$2(\zeta + \zeta_a) = 3\zeta_d. \tag{39}$$

The passive damping ratio must be selected independently. It should be small for good isolation, that is, separation of the motion between the vehicle body and the wheel, but not so small that the neglected wheel and tire dynamics have only slight damping.

If $\zeta_d = \frac{1}{2}$ is selected, which results in a faster response and better damping for the system than was achievable with those in earlier examples, and if $\zeta = \frac{1}{4}$, then from equations (37–39), $\zeta_a = g' = h = \frac{1}{2}$. FIG. 7 shows the resultant frequency response for this system.

From this frequency response, it is apparent that the suspension is a nearly ideal filter. Components of roadway unevenness, the frequencies of which are lower than the natural frequency, are faithfully followed by the body mass. Higher-frequency components are effectively filtered out, and there is no resonant amplification at all.

The load leveling action occurs with a time constant of $1/\zeta_d=2$ in nondimensional time, or $2/\omega_n$ in real time. For a 1 Hz suspension, the time constant is $1/\pi$ s. This is considerably faster than is possible in the above-discussed systems.

An interesting feature of this concept is that if the load leveling is disabled ($g'=h=0$), the suspension reverts to an actively damped suspension with a damping ratio of ¾ in the denominator and ¼ in the numerator. This represents a nearly optimum actively damped suspension. Even if the active damping were also removed ($\zeta_a=0$), the suspension merely becomes a conventional passive suspension with a fairly typical damping ratio of $\zeta=¼$. Thus it seems reasonable to switch off the load leveler to save power whenever it is not actually needed, and to switch off all the active elements as well in the event of sensor or controller failure.

An active suspension based on a fast-acting load leveler with an active or semi-active damper and body velocity feedback is therefore highly advantageous as compared with previously known systems, not only in terms of the complete flexibility in adjustment of the closed loop dynamics, but also because the suspension can be designed to revert to, or assume, reasonably actively damped or passive configurations when the truly active part or parts are switched off. This allows energy savings during all non-critical driving conditions, as well as fail-safe design concepts that are not possible with other types of active suspensions.

It has been shown above that vehicle suspension based on fast-acting load levelers exhibits nearly ideal suspension behavior, with the use of load-leveler control based on the relative position between the wheel and the vehicle body and on "absolute" body velocity, in connection with some passive damping options for wheel control, as well as an active damping force that is proportional only to the absolute body velocity.

Inclusion of Acceleration Variables

It also becomes possible for feedback of the acceleration variable of the isolated mass to the load leveler velocity source to augment or even replace active damping forces. Semi-active dampers require very little power, but these devices cannot precisely generate the desired active force components. It may therefore be important for feedback of an acceleration variable to a load leveler to be included in the active damping concept, although this may increase the power requirements of the load leveler.

The basic functions discussed above can be extended to more complex systems by inserting the variable $(h+k_a s)$ for the term h in the equations (29)–(33), in order to find that the velocities $V_A$ and $V_B$ can be controlled by the additional acceleration gain $k_a$. (The acceleration of the body is S·V.)

The transfer functions in equations (32) and (33) then have modified denominators, taking the following form:

$$Ms^3+(B+B_A+k_a k)s^2+K(1+h)s+Kg \quad (40)$$

with unchanged numerators. Thus, if $k_a$ is introduced, then $B_A$ can be reduced or even eliminated. Although the anlysis has been made in terms of idealized linear systems, there appears to be no difference between the results of associating an active damper, or acceleration feedback, with a load leveler; however, there are many differences in the hardware required for the two cases. The necessity arises of providing a signal representing the absolute velocity, in any case. This signal could be differentiated approximately, in order to obtain an acceleration signal, or an accelerometer could be used directly. One possibility for generating a V-signal is to integrate an accelerometer-generated signal in the first place.

Figure 8:
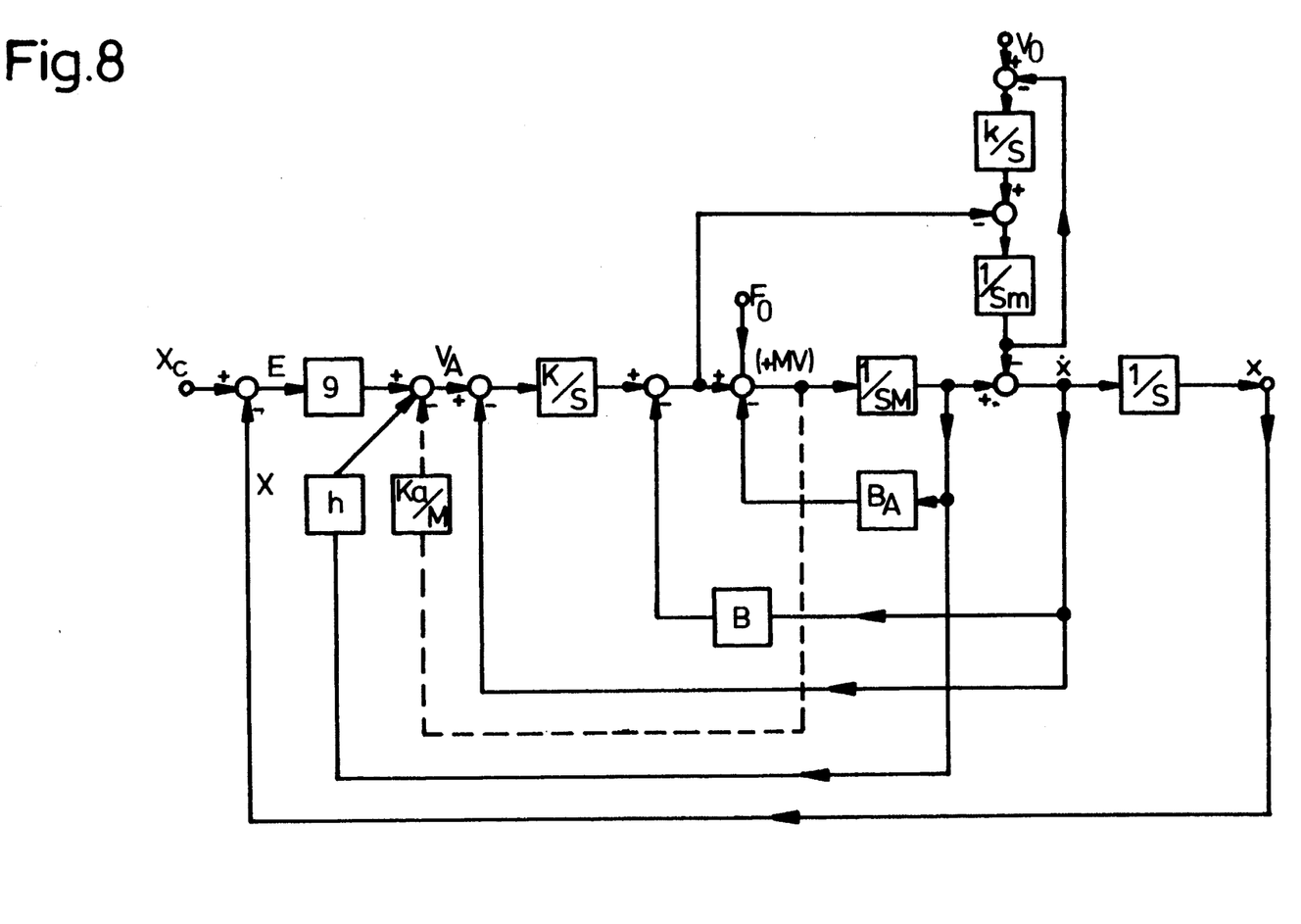
FIG. 8 schematically shows a block diagram of a closed loop control scheme that, in augmentation of the block circuit diagram of FIG. 6 and of the signals used thus far for the closed loop control, also has an absolute acceleration feedback.

On the other hand, if variable dampers are to be used, there is a certain tendency to using semiactive dampers here, so that the V-signal can be at least approximately used to generate the combination of active and passive damping forces. As a result, a virtually optimal damping can be attained in the system, without expending energy for the load leveler. In any case, the inclusion of acceleration feedback signals in the overall control scheme is an advantageous embodiment in the novel suspension concepts set forth here, having active damping force generation and active suspensions based on load leveling. A block circuit diagram for this function is provided in FIG. 8.

In summary, it can be stated that the compensation of static control deviations is considerably faster, in comparison with conventional load leveling systems with feedback of only the relative suspension deflection, nor does it become unstable. It will be understood that the signals detected by actual-value sensors and fed back to the FLLS component (air suspension) and to the active or semi-active dampers are generated in the manner and combination described above, because it is the combination of the two control elements with the corresponding sensor signals that assures full controllability and hence stable system behavior, with all the attendant advantages named.

In the invention, it should also be noted that although the relative suspension deflection is fed back only proportionally, an integral controller behavior is obtained because of the properties of the total control system having the appropriate control components, even though the relative suspension deflection is fed back only proportionally; this means that the feedback of the vertical velocity has no influence on the fact that in the steady state the control deviation in the deflection goes to zero.

The foregoing relates to preferred exemplary embodiments of the invention, it being understood that other variants and embodiments thereof are possible within the spirit and scope of the invention, the latter being defined claims.

What is claimed and desired to be secured by Letters Patent of the United States is:

1. An apparatus secured between a vehicle body (M) and wheel (m) for active body suspension control in motor vehicles having a plurality of springs and damping elements, comprising a load leveling body suspension system (FLLS) which includes a controller (R″), a relative position sensor (WS) which produces a relative body suspension deflection output signal ($X_{rel}$) derived from a vertical position of said vehicle body relative to the wheel position, a first control element (LF) which is an air suspension having a spring constant, means (QA) for permitting fluid flow to and from said first control element (LF), a second control element in the form of a semi-active damper ($B_{Sa}$), said first and second control elements being positioned between the wheel and the body, a signal processing circuit (BF, I), a body motion sensor ($B_S$) connected with said signal processing circuit for determining body velocity which is converted into an absolute vertical velocity output signal ($V_{abs}$) by said signal processing circuit, said absolute vertical velocity signal ($V_{abs}$) and said relative body suspension deflection output signal ($X_{rel}$) are directed into said controller ($R''$), said controller ($R''$) directs an output signal (FLLS) to said first control element (LF) to control said first control element, said absolute vertical velocity signal ($V_{abs}$ is also directed into controller ($R''$) said and said controller ($R''$) directs an output signal (SA) to said second control element ($B_{Sa}$) to control said second control element.

2. An apparatus as defined by claim 1, in which said semi-active damper ($B_{sa}$) is in series with a passive damper element disposed between the wheel suspension and the vehicle body and integrated into an active control system.

3. An apparatus as defined by claim 2, in which said passive damper element is disposed in parallel with said first control element.

4. An apparatus as defined by claim 2, in which said passive damper element present between the wheel suspension and the body is designed such that for predetermined driving states, said first control element is switched off during operation of the vehicle, in such a manner that a power saving on the one hand and fail-safe operation on the other are attainable.

5. An apparatus as defined by claim 1, in which a band pass filter is provided for obtaining the vertical absolute velocity ($V_{abs}$) of the body.

* * * * *